US012013265B2

(12) United States Patent
Chen et al.

(10) Patent No.: US 12,013,265 B2
(45) Date of Patent: Jun. 18, 2024

(54) INFRARED SENSING MODULE, TERMINAL DEVICE, CONTROL METHOD OF TERMINAL DEVICE, AND NON-TRANSITORY COMPUTER-READABLE STORAGE MEDIUM

(71) Applicant: VIVO MOBILE COMMUNICATION CO., LTD., Guangdong (CN)

(72) Inventors: Jie Chen, Guangdong (CN); Xujun Mao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 314 days.

(21) Appl. No.: 17/540,045

(22) Filed: Dec. 1, 2021

(65) Prior Publication Data

US 2022/0090945 A1 Mar. 24, 2022

Related U.S. Application Data

(63) Continuation of application No. PCT/CN2020/087236, filed on Apr. 27, 2020.

(30) Foreign Application Priority Data

Jun. 26, 2019 (CN) .......................... 201910561068.X (51) Int. Cl.
*G01D 5/353* (2006.01)
*G01D 5/32* (2006.01)
(Continued)

(52) U.S. Cl.
CPC ........... *G01D 5/35367* (2013.01); *G01D 5/32* (2013.01); *G01S 7/4812* (2013.01); *G01S 7/4813* (2013.01);
(Continued)

(58) Field of Classification Search
CPC ...... G01D 5/35367; G01D 5/32; G01S 17/04; G01S 17/06; G01S 7/4812; G01S 7/4813;
(Continued)

(56) References Cited

U.S. PATENT DOCUMENTS 5,633,710 A * 5/1997 Kumra ................ G01M 11/068
362/465
2009/0136175 A1 5/2009 Koitabashi
(Continued)

FOREIGN PATENT DOCUMENTS

CN 101447326 A 6/2009
CN 101511036 A 8/2009
(Continued)

OTHER PUBLICATIONS

Office Action issued by the Chinese Patent Office on Feb. 24, 2021.
(Continued)

*Primary Examiner* — Jennifer D Bennett
*Assistant Examiner* — Erin R Garber
(74) *Attorney, Agent, or Firm* — IP & T GROUP LLP (57) ABSTRACT

An infrared sensing module includes a reflecting portion, a driving portion, an infrared light emitter and an infrared light receiver. The driving portion is connected to the reflecting portion, and the driving portion drives the reflecting portion to rotate, and an infrared reflecting layer of the reflecting portion faces the infrared light emitter and the infrared light receiver when the reflecting portion rotates to a preset position.

13 Claims, 5 Drawing Sheets

(51) Int. Cl.
    *G01S 7/481*     (2006.01)
    *G01S 17/04*     (2020.01)
    *G01S 17/06*     (2006.01)
    *G06F 1/16*     (2006.01)

(52) U.S. Cl.
    CPC .............. *G01S 17/04* (2020.01); *G01S 17/06* (2013.01); *G06F 1/1658* (2013.01); *G06F 1/1626* (2013.01)

(58) Field of Classification Search
    CPC .... G06F 1/1658; G06F 1/1626; G06F 1/1637; G06F 1/1647; G06F 1/1656; G06F 1/1684; G06F 1/1694
    See application file for complete search history.

(56) References Cited

U.S. PATENT DOCUMENTS

| 2015/0205439 | A1 | 7/2015 | Xu et al. |
| 2015/0331109 | A1* | 11/2015 | Christensen .......... G01S 7/4808 356/458 |
| 2016/0179196 | A1 | 6/2016 | Chang et al. |
| 2020/0142041 | A1* | 5/2020 | Gassend .................. G01S 17/89 |
| 2020/0162592 | A1* | 5/2020 | Goeltner ............ A61B 5/14552 |

FOREIGN PATENT DOCUMENTS

| CN | 101893431 A | 11/2010 | |
| CN | 103235670 A | 8/2013 | |
| CN | 204926047 U | 12/2015 | |
| CN | 105718047 A | 6/2016 | |
| CN | 106055178 A | 10/2016 | |
| CN | 205643711 U | 10/2016 | |
| CN | 107193102 A | 9/2017 | |
| CN | 107193102 A * | 9/2017 | |
| CN | 107884975 A | 4/2018 | |
| CN | 208059912 U | 11/2018 | |
| CN | 109803078 A | 5/2019 | |
| CN | 110332950 A | 10/2019 | |
| JP | H09-16325 A | 1/1997 | |
| KR | 10-2011-0051601 A | 5/2011 | |
| WO | 2017003160 A1 | 1/2017 | |
| WO | WO-2019004146 A1 * | 1/2019 | ............. G01S 17/08 |

OTHER PUBLICATIONS

International Search Report and Written Opinion issued by the Chinese Patent Office on Jul. 22, 2020.

* cited by examiner

INFRARED SENSING MODULE, TERMINAL DEVICE, CONTROL METHOD OF TERMINAL DEVICE, AND NON-TRANSITORY COMPUTER-READABLE STORAGE MEDIUM

CROSS-REFERENCE TO RELATED APPLICATIONS

This application is a Bypass Continuation Application of PCT/CN2020/087236 filed on Apr. 27, 2020, which claims priority to Chinese Patent Application No. 201910561068.X filed on Jun. 26, 2019, which are incorporated herein by reference in their entirety.

TECHNICAL FIELD

The present disclosure relates to the technical field of terminal devices, and in particular, to an infrared sensing module, a terminal device, and a control method of a terminal device.

BACKGROUND

With the increase of user demands, a screen ratio (the ratio of the display area to the front panel area of the terminal device) of terminal devices is increasing. A larger screen ratio can provide users with a better operation interface and visual experience. To enlarge a display area of a terminal device, a double-sided-screen terminal device rises to the occasion. In other words, front and back sides of the terminal device are both provided with display screens, which also extremely compresses stacking space of the terminal device in a thickness direction (that is, a direction perpendicular to the display screens).

With the increase of user demands, functions of terminal devices are increasing, where an infrared sensing function is a relatively practical function, which can realize functions such as distance detection, proximity detection, and ambient light detection. Because both sides are provided with the display screens, there are independent application scenarios on the front and back sides of the terminal device. In a case that an infrared sensing function is configured, the front and back sides of the terminal device are configured with infrared sensing requirements. Based on this, infrared sensors are disposed on both sides of a terminal device, so as to realize independent infrared sensing on both sides.

SUMMARY

An infrared sensing module is provided, including a reflecting portion, a driving portion, an infrared light emitter, and an infrared light receiver, where the driving portion is connected to the reflecting portion, the driving portion drives the reflecting portion to rotate, and an infrared reflecting layer of the reflecting portion faces the infrared light emitter and the infrared light receiver when the reflecting portion rotates to a preset position.

A terminal device is provided, including a housing and the foregoing infrared sensing module, where the infrared sensing module is disposed in the housing, the housing is provided with an inner cavity, and two opposite sides of the housing are respectively provided with a first light-transmitting hole and a second light-transmitting hole through which light can be transmitted to the inner cavity, where when the reflecting portion rotates to a first position, infrared light emitted by the infrared light emitter is emitted out of the first light-transmitting hole after being reflected by the reflecting portion, and after the infrared light is reflected by a detection object, the reflecting portion reflects the infrared light to the infrared light receiver; or when the reflecting portion rotates to a second position, infrared light emitted by the infrared light emitter is emitted out of the second light-transmitting hole after being reflected by the reflecting portion, and after the infrared light is reflected by a detection object, the reflecting portion reflects the infrared light to the infrared light receiver.

A control method of a terminal device is provided, where the terminal device is the foregoing terminal device, and the control method includes:
 driving, via the driving portion, the reflecting portion to rotate;
 determining whether an intensity of an infrared signal received by the infrared light receiver meets a preset condition; and
 fixing a position of the reflecting portion in a case that the intensity of the infrared signal meets the preset condition.

A control apparatus of a terminal device is provided, where the terminal device is the foregoing terminal device, and the control apparatus includes:
 a first control module, configured to control the driving portion to drive the reflecting portion to rotate;
 a determining module, configured to determine whether an intensity of an infrared signal received by the infrared light receiver meets a preset condition; and
 a second control module, configured to fix a position of the reflecting portion in a case that the intensity of the infrared signal meets the preset condition.

A terminal device is provided, including a processor, a memory, and a computer program stored in the memory and executable on the processor, where when the computer program is executed by the processor, steps of the foregoing control method are implemented.

A non-transitory computer-readable storage medium, where the non-transitory computer-readable storage medium stores a computer program, and when the computer program is executed, steps of the foregoing control method are implemented.

BRIEF DESCRIPTION OF DRAWINGS

The accompanying drawings described herein are intended to provide a understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DESCRIPTION OF REFERENCE NUMERALS

100—housing, 110—inner cavity, 120—first light-transmitting hole, 130—second light-transmitting hole, 200—reflecting portion, 210—base portion, 220—infrared reflecting layer, 230—infrared absorbing layer, 300—driving portion, 400—infrared light emitter, 500—infrared light receiver, 600—circuit board, 700—first screen assembly, and 800—second screen assembly.

DETAILED DESCRIPTION OF EMBODIMENTS

To make the objectives, technical solutions, and advantages of the present disclosure clearer, the following clearly describes the technical solutions in the present disclosure with reference to embodiments of the present disclosure and the corresponding accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

Because stacking space of a double-sided-screen terminal device in a thickness direction is relatively confined, disposing infrared sensors on both sides of the terminal device inevitably occupies relatively large space, which makes stacking of the terminal device in the thickness direction more difficult. Certainly, in addition to double-sided-screen terminal devices, other terminal devices may also have a demand of disposing infrared sensors on both sides. With the lightening and thinning development of terminal devices, a terminal device provided with infrared sensors on both sides is still relatively thick.

The technical solutions disclosed in the embodiments of the present disclosure are described in detail with reference to the accompanying drawings.

Referring to FIGS. 1 to 5, an embodiment of the present disclosure discloses an infrared sensing module. The infrared sensing module may be applied to a terminal device. The infrared sensing module includes a reflecting portion 200, a driving portion 300, an infrared light emitter 400, and an infrared light receiver 500.

The infrared light emitter 400 is configured to emit infrared light. The infrared light receiver 500 is configured to receive infrared light. The reflecting portion 200 is configured to reflect infrared light. A projection direction of the infrared light emitted by the infrared light emitter 400 may change after being reflected by the infrared reflecting layer 220 of the reflecting portion 200.

The driving portion 300 is connected to the reflecting portion 200. The driving portion 300 can drive the reflecting portion 200 to rotate, thereby adjusting a working position of the reflecting portion 200. When the reflecting portion 200 rotates to a preset position, the infrared reflecting layer 220 of the reflecting portion 200 faces the infrared light emitter 400 and the infrared light receiver 500, so that the infrared light can be reflected.

In a working process, the driving portion 300 drives the reflecting portion 200 to rotate, so that the position of the reflecting portion 200 can be changed, which enables the reflecting portion 200 to work at a plurality of positions. In an infrared detection process, the driving portion 300 drives the reflecting portion 200 to rotate to the preset position. In this case, the infrared light emitted by the infrared light emitter 400 can be projected onto the infrared reflecting layer 220 of the reflecting portion 200. Infrared light reflected by the infrared reflecting layer 220 can be projected onto a detection object (for example, a human face). Infrared light reflected by the detection object can be reflected by the infrared reflecting layer 220 to the infrared light receiver 500. In this process, a detection result can be obtained via processing based on an amount of the infrared light emitted by the infrared light emitter 400 and an amount of the infrared light received by the infrared light receiver 500. A process and principle of using infrared light for detection are both well-known technologies. Details are not described herein.

In the infrared sensing module disclosed in the embodiment of the present disclosure, the driving portion 300 can drive the reflecting portion 200 to rotate, and when the reflecting portion 200 rotates to the preset position, the infrared reflecting layer 220 of the reflecting portion 200 can face the infrared light emitter 400 and the infrared light receiver 500, thereby making them work. Because the reflecting portion 200 can rotate, infrared detection at a plurality of positions can be realized. When an infrared sensing module of this structure is applied to a terminal device, infrared detection in a plurality of directions of the terminal device can be realized. In this case, to realize infrared detection in at least two directions, the terminal device needs to be provided with only one infrared sensing module, and there is no need to dispose an infrared sensor in each detection direction. Therefore, stacking can be reduced, and thinning of the terminal device is facilitated.

In this embodiment of the present disclosure, there are at least two preset positions. In an implementation, there are two preset positions. In a case that there are two preset positions, if the infrared sensing module is disposed in the terminal device, infrared detection can be realized on two sides of the terminal device, respectively.

Figure 1:
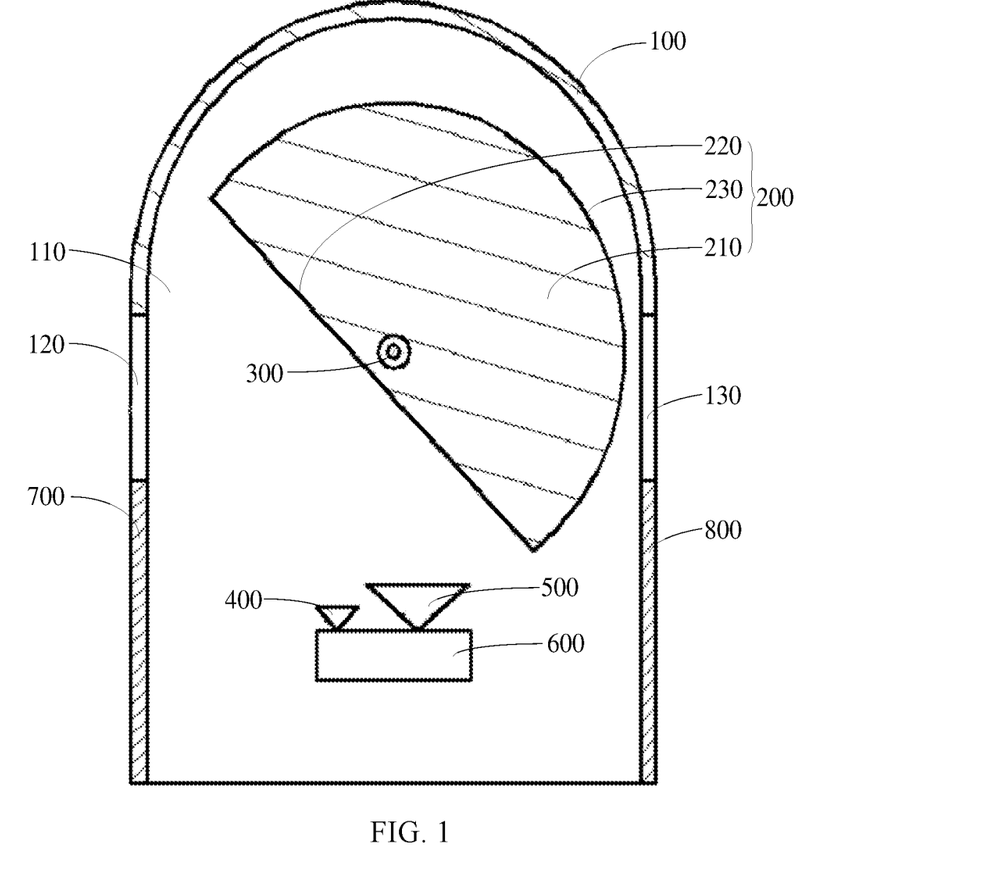
FIG. 1 is a schematic diagram of a partial structure of a terminal device according to an embodiment of the present disclosure.

To facilitate assembly, in a more optional solution, the infrared sensing module may further include a circuit board 600. The infrared light emitter 400 and the infrared light receiver 500 are disposed on the circuit board 600, and are electrically connected to the circuit board 600. In this case, the infrared light emitter 400 and the infrared light receiver 500 may be mounted on the circuit board 600 first, which facilitates modularization of the infrared sensing module. Owning to the foregoing assembly structure, the infrared light emitter 400 and the infrared light receiver 500 can be mounted in the terminal device more conveniently. In an optional solution, the infrared light emitter 400 and the infrared light receiver 500 may be disposed at an interval, thereby avoiding mutual impacts.

Figure 5:
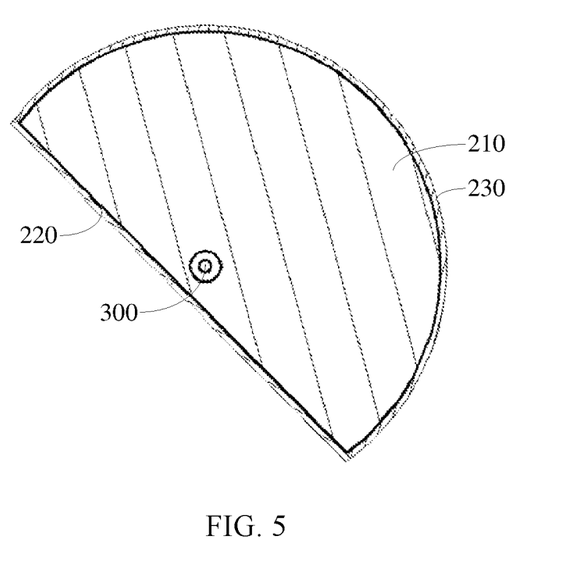
FIG. 5 is an enlarged schematic structural diagram of a reflecting portion according to an embodiment of the present disclosure.

In this embodiment of the present disclosure, the reflecting portion 200 may have various structures, and may be a common reflection structural member, for example, a plane mirror. Certainly, the reflecting portion 200 may also have another structure. Referring to FIG. 5, the reflecting portion 200 in this embodiment of the present disclosure may include a base portion 210 and an infrared reflecting layer 220 disposed on the base portion 210. The driving portion 300 drives and is connected to the base portion 210. The infrared reflecting layer 220 is configured to reflect infrared light.

In a case that the terminal device does not perform infrared detection, the reflecting portion 200 does not need to reflect infrared light out of the terminal device any more.

Figure 4:
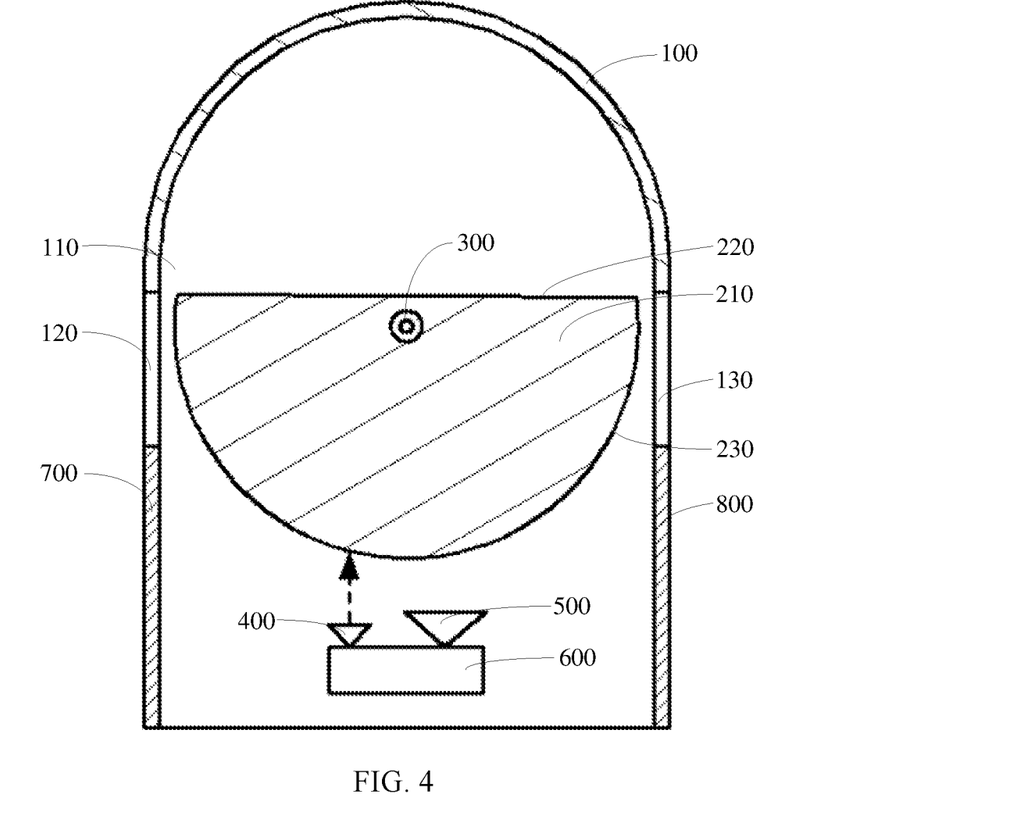
FIG. 4 is a schematic working diagram of a terminal device at a third position according to an embodiment of the present disclosure.

Based on this, the base portion 210 may be provided with an infrared absorbing layer 230. The driving portion 300 can drive the reflecting portion 200 to rotate to a position (namely, a third position) where the infrared absorbing layer 230 is opposite to the infrared light emitter 400, so that the infrared absorbing layer 230 can absorb the infrared light emitted by the infrared light emitter 400, and the infrared light can be prevented from being projected out through a first light-transmitting hole 120 or a second light-transmitting hole 130. Certainly, there may be no need to turn off the infrared light emitter 400, and a control module of the terminal device may control the infrared light emitter 400 and the infrared light receiver 500 to stop working.

The base portion 210 has various structures. To ensure that the base portion 210 can stay in a non-working position more conveniently, a surface of the base portion 210 may include a straight surface and a curved surface cohered with the straight surface. The infrared reflecting layer 220 is disposed on the straight surface, and the infrared absorbing layer 230 is disposed on the curved surface. All parts of the curved surface are located in a same cylindrical surface. An area of the base portion 210 located at the center of the cylindrical surface drives and is connected to the driving portion 300. In this case, owing to a gravity center of the base portion 210, it is easier to make the reflecting portion 200 at a position where the infrared absorbing layer 230 is opposite to the infrared light emitter 400.

The infrared absorbing layer 230 and the infrared reflecting layer 220 are coatings or sticky films. Structures of the infrared absorbing layer 230 and the infrared reflecting layer 220 are not limited in this embodiment of the present disclosure.

Based on the infrared sensing module in this embodiment of the present disclosure, an embodiment of the present disclosure discloses a terminal device. The terminal device includes a housing 100 and the infrared sensing module in the foregoing embodiment. The infrared sensing module is disposed in the housing 100.

The housing 100 is a basic component of the terminal device. The housing 100 can provide a mounting foundation for other components of the terminal device. The housing 100 is provided with an inner cavity 110. In this embodiment of the present disclosure, the reflecting portion 200, the driving portion 300, the infrared light emitter 400, and the infrared light receiver 500 are all disposed in the inner cavity 110.

In this embodiment of the present disclosure, the first light-transmitting hole 120 and the second light-transmitting hole 130 are respectively formed in two opposite sides of the housing 100. The first light-transmitting hole 120 and the second light-transmitting hole 130 face different directions. Light can be transmitted into the inner cavity 110 through the first light-transmitting hole 120 and the second light-transmitting hole 130. Certainly, according to a principle of light path reversibility, light in the inner cavity 110 can also be projected out of the housing 100 through the first light-transmitting hole 120 and the second light-transmitting hole 130. In this case, there may be two preset positions: a first position and a second position.

The infrared light emitted by the infrared light emitter 400 may be projected out of the housing 100 through the first light-transmitting hole 120 or the second light-transmitting hole 130 after being reflected by the reflecting portion 200. Infrared light projected out of the housing 100 may enter the housing 100 again through the first light-transmitting hole 120 or the second light-transmitting hole 130 after being reflected by the detection object, and then be reflected by the reflecting portion 200 to the infrared light receiver 500. Finally, a detection result is obtained based on a difference of infrared light. For example, the driving portion 300 drives the reflecting portion 200 to rotate, so that the reflecting portion 200 is in switching fit with the first light-transmitting hole 120 and the second light-transmitting hole 130, respectively.

Figure 2:
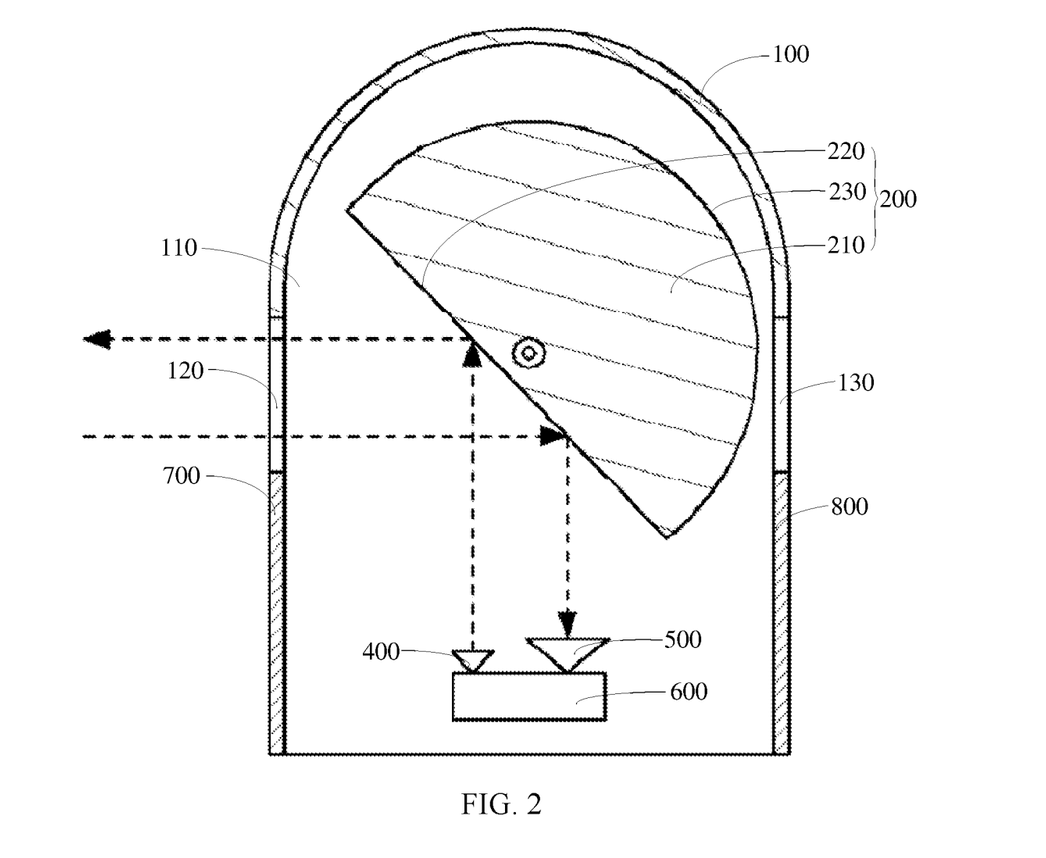
FIG. 2 is a schematic working diagram of a terminal device at a first position according to an embodiment of the present disclosure.

As shown in FIG. 2, when the reflecting portion 200 rotates to the first position, the infrared light emitted by the infrared light emitter 400 is emitted out through the first light-transmitting hole 120 after being reflected by the reflecting portion 200. After the infrared light is reflected by the detection object, the reflecting portion 200 reflects, to the infrared light receiver 500, infrared light that passes through the first light-transmitting hole 120 from the outside of the terminal device. According to this process, infrared detection on one side of the terminal device can be implemented.

Figure 3:
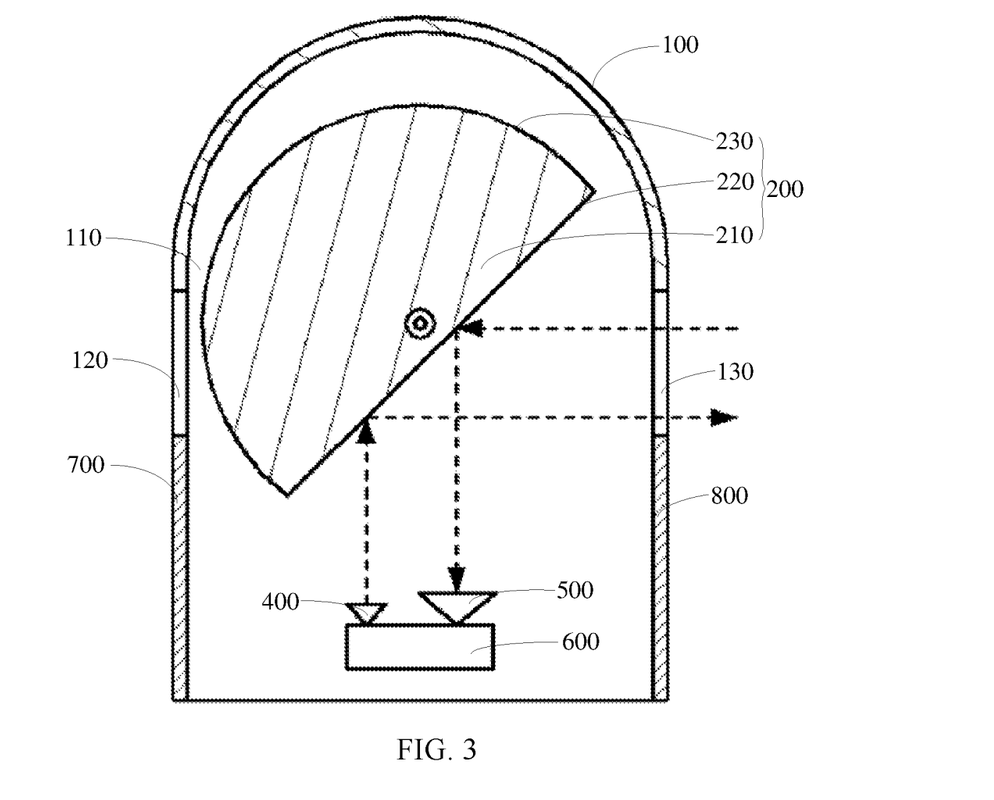
FIG. 3 is a schematic working diagram of a terminal device at a second position according to an embodiment of the present disclosure.

As shown in FIG. 3, when the reflecting portion 200 rotates to the second position, the infrared light emitted by the infrared light emitter 400 is emitted out through the second light-transmitting hole 130 after being reflected by the reflecting portion 200. After the infrared light is reflected by the detection object, the reflecting portion 200 reflects infrared light to the infrared light receiver 500. According to this process, infrared detection on the other side of the terminal device can be implemented.

In the terminal device in this embodiment of the present disclosure, the driving portion 300 drives the reflecting portion 200 to rotate, so that the reflecting portion 200 can rotate to the first position or the second position, thereby implementing matching with the first light-transmitting hole 120 and the second light-transmitting hole 130 at different positions respectively. Therefore, the infrared light emitter 400 and the infrared light receiver 500 can be matched with the first light-transmitting hole 120 when the reflecting portion 200 is at one position, and matched with the second light-transmitting hole 130 when the reflecting portion 200 is at another position. In this case, an infrared detection function can be realized on both sides of the terminal device by disposing only one set of the infrared light emitter 400 and the infrared light receiver 500 in the terminal device. Compared with infrared detection components are disposed on both sides of a terminal device, this embodiment has the benefit that a quantity of infrared detection components can be undoubtedly reduced, which can reduce occupation of space in the housing 100, and facilitates thinning of the terminal device.

In addition, reduction of infrared detection components can also reduce manufacturing costs of the terminal device and simplify a structure of the terminal device.

As mentioned above, the first light-transmitting hole 120 and the second light-transmitting hole 130 are respectively formed in two opposite sides of the housing 100. Generally, the terminal device includes a first screen assembly 700. The first light-transmitting hole 120 may be formed in one side that is of the housing 100 and where the first screen assembly 700 is mounted. The first screen assembly 700 includes a first light-transmitting area covering the first light-transmitting hole 120. For example, the first screen assembly 700 may include a first light-transmitting cover plate. The first light-transmitting cover plate includes the first light-transmitting area. The first light-transmitting area of the first light-transmitting cover plate covers the first light-transmitting hole 120. On the premise that light-transmitting of the first light-transmitting hole 120 is not affected, the first light-transmitting area can further seal the first light-transmitting hole 120, to achieve dust-proof and waterproof effects.

On the premise that the terminal device is a single-screen terminal device, the second light-transmitting hole 130 may be formed in one side that is of the housing 100 and where a battery cover is located.

To enlarge a display area of the terminal device, in a more optional solution, the terminal device may further include a second screen assembly 800. The first screen assembly 700 and the second screen assembly 800 may be mounted on two sides of the housing 100, respectively. In this case, the terminal device is a double-sided-screen terminal device. The double-sided-screen terminal device includes the first screen assembly 700 and the second screen assembly 800, which can undoubtedly enlarge the display area of the terminal device and improve display performance of the terminal device.

For example, the second screen assembly 800 may include a second light-transmitting area covering the second light-transmitting hole 130. Generally, the second screen assembly 800 includes a second light-transmitting cover plate. The second light-transmitting cover plate includes the second light-transmitting area. The second light-transmitting area of the second light-transmitting cover plate covers the second light-transmitting hole 130. On the premise that light-transmitting of the second light-transmitting hole 130 is not affected, the second light-transmitting area can further seal the second light-transmitting hole 130, to achieve dust-proof and waterproof effects.

The terminal device in this embodiment of the present disclosure may be a smart phone, a tablet computer, a wearable device, an e-book reader, or the like. A type of the terminal device is not limited in this embodiment of the present disclosure.

Based on the terminal device in this embodiment of the present disclosure, an embodiment of the present disclosure discloses a control method of a terminal device. The control method includes the following steps.

Step 1: Drive, via a driving portion 300, a reflecting portion 200 to rotate.

In this step, the driving portion 300 may be controlled to drive the reflecting portion 200 to rotate cyclically.

Step 2: Determine whether an intensity of an infrared signal received by an infrared light receiver 500 meets a preset condition.

Due to rotation of the reflecting portion 200, infrared light emitted by an infrared light emitter 400 can be emitted through a first light-transmitting hole 120 and a second light-transmitting hole 130 after being reflected by the reflecting portion 200. Therefore, a detection object may be disposed on one side that the first light-transmitting hole 120 faces or one side that the second light-transmitting hole 130 faces. Infrared light projected out of a housing 100 is reflected when meeting the detection object, and is finally reflected by the reflecting portion 200 into the infrared light receiver 500 after passing through the first light-transmitting hole 120 or the second light-transmitting hole 130. Certainly, in a case that the infrared light does not meet the detection object, an amount of infrared light reflected back into the housing 100 is relatively small. Therefore, a position of the detection object can be determined based on an intensity of an infrared signal received by the infrared light receiver 500.

Step 3: Fix a position of the reflecting portion 200 in a case that the intensity of the infrared signal meets the preset condition.

In this step, that the intensity of the infrared signal meets the preset condition means that there is a detection object. In this case, the position of the reflecting portion 200 is fixed. For example, the driving portion 300 may be controlled to stop driving the reflecting portion 200, so that the position of the reflecting portion 200 is fixed.

Generally, the terminal device does not perform infrared detection in an idle state. In order to achieve more efficient control, in a more optional solution, the terminal device may include a gravity sensor. On the premise that the terminal device includes the gravity sensor, step 1 may further include the following sub-steps:

Step A: Detect whether a signal of the gravity sensor of the terminal device is changed.

Step B: In a case that the signal of the gravity sensor is changed, control the driving portion 300 to be enabled.

Generally, the signal detected by the gravity sensor is changed when a user picks up the terminal device. Under this condition, the driving portion 300 is controlled to be enabled.

Based on the control method in this embodiment of the present disclosure, an embodiment of the present disclosure discloses a control apparatus of a terminal device. The control apparatus may include:

a first control module, configured to control the driving portion 300 to drive the reflecting portion 200 to rotate;

a determining module, configured to determine whether an intensity of an infrared signal received by the infrared light receiver 500 meets a preset condition; and a second control module, configured to fix a position of the reflecting portion 200 in a case that the intensity of the infrared signal meets the preset condition.

An embodiment of the present disclosure discloses a terminal device. The terminal device includes a processor, a memory, and a computer program stored in the memory and executable on the processor. When the computer program is executed by the processor, steps of the foregoing control method are implemented.

An embodiment of the present disclosure discloses a non-transitory computer-readable storage medium. The non-transitory computer-readable storage medium stores a computer program, and when the computer program is executed, steps of the foregoing control method are implemented.

The above embodiments of the present disclosure mainly describe the differences between various embodiments. As long as the different optimization features of the various embodiments are not contradictory, the various embodiments can be combined to form a better embodiment. Considering the brevity of the text, details are not described herein again.

The foregoing descriptions are merely embodiments of this disclosure, but are not intended to limit this disclosure. For a person skilled in the art, the present disclosure may have various changes and variations. Any modification, equivalent replacement, or improvement made without departing from the spirit and principle of this disclosure shall fall within the scope of claims of this disclosure.

What is claimed is:

1. An infrared sensing module, comprising a reflecting portion, a driving portion, an infrared light emitter and an infrared light receiver, wherein the driving portion is connected to the reflecting portion, the driving portion drives the reflecting portion to rotate, and an infrared reflecting layer of the reflecting portion faces the infrared light emitter and the infrared light receiver when the reflecting portion rotates to a preset position;

the reflecting portion comprises a base portion and the infrared reflecting layer disposed on the base portion, and the driving portion drives and is connected to the base portion; and the base portion is provided with an infrared absorbing layer, and the driving portion drives the reflecting portion to rotate to a position where the infrared absorbing layer is opposite to the infrared light emitter.

2. The infrared sensing module according to claim 1, further comprising a circuit board, wherein the infrared light emitter and the infrared light receiver are disposed on the circuit board, and are electrically connected to the circuit board.

3. The infrared sensing module according to claim 1, wherein a surface of the base portion comprises a flat surface and a curved surface cohered with the flat surface, the infrared reflecting layer is disposed on the flat surface, the infrared absorbing layer is disposed on the curved surface, all parts of the curved surface are located on a same cylindrical surface, and an area of the base portion located at the center of the cylindrical surface drives and is connected to the driving portion.

4. The infrared sensing module according to claim 3, wherein the infrared absorbing layer and the infrared reflecting layer are coatings or sticky films.

5. A terminal device, comprising a housing and the infrared sensing module according to claim 1, wherein the infrared sensing module is disposed in the housing, the housing is provided with an inner cavity, and two opposite sides of the housing are respectively provided with a first light-transmitting hole and a second light-transmitting hole through which light is transmitted to the inner cavity, wherein when the reflecting portion rotates to a first position, infrared light emitted by the infrared light emitter is emitted out of the first light-transmitting hole after being reflected by the reflecting portion, and after the infrared light is reflected by a detection object, the reflecting portion reflects the infrared light to the infrared light receiver; or when the reflecting portion rotates to a second position, infrared light emitted by the infrared light emitter is emitted out of the second light-transmitting hole after being reflected by the reflecting portion, and after the infrared light is reflected by a detection object, the reflecting portion reflects the infrared light to the infrared light receiver.

6. The terminal device according to claim 5, further comprising a first screen assembly, wherein the first screen assembly comprises a first light-transmitting area covering the first light-transmitting hole.

7. The terminal device according to claim 6, further comprising a second screen assembly, wherein the first screen assembly and the second screen assembly are respectively mounted on two opposite sides of the housing, and the second screen assembly comprises a second light-transmitting area covering the second light-transmitting hole.

8. A control method of a terminal device, wherein the terminal device is the terminal device according to claim 5, and the control method comprises:

driving, via the driving portion, the reflecting portion to rotate;

determining whether an intensity of an infrared signal received by the infrared light receiver meets a preset condition; and fixing a position of the reflecting portion in a case that the intensity of the infrared signal meets the preset condition.

9. The method according to claim 8, wherein the terminal device comprises a gravity sensor, and the driving, via the driving portion, the reflecting portion to rotate comprises:

detecting whether a signal of the gravity sensor is changed; and in a case that the signal of the gravity sensor is changed, enabling the driving portion to drive the reflecting portion to rotate.

10. A terminal device, comprising the infrared sensing module according to claim 1; wherein the terminal device further comprises a processor, a memory, and a computer program stored in the memory and executable on the processor, wherein the computer program, when executed by the processor, causes the terminal device to perform:

driving, via the driving portion, the reflecting portion to rotate;

determining whether an intensity of an infrared signal received by the infrared light receiver meets a preset condition; and fixing a position of the reflecting portion in a case that the intensity of the infrared signal meets the preset condition.

11. The terminal device according to claim 10, wherein the computer program, when executed by the processor, causes the terminal device to perform:

detecting whether a signal of a gravity sensor of the terminal device is changed; and in a case that the signal of the gravity sensor is changed, enabling the driving portion to drive the reflecting portion to rotate.

12. A non-transitory computer-readable storage medium, wherein the non-transitory computer-readable storage medium stores a computer program, and the computer program, when executed, causes a terminal device which comprises the infrared sensing module according to claim 1 to perform:

driving, via a driving portion of the terminal device, a reflecting portion of the terminal device to rotate;

determining whether an intensity of an infrared signal received by an infrared light receiver of the terminal device meets a preset condition; and fixing a position of the reflecting portion in a case that the intensity of the infrared signal meets the preset condition.

13. The non-transitory computer-readable storage medium according to claim 12, wherein the computer program, when executed, causes the terminal device to perform:

detecting whether a signal of a gravity sensor of the terminal device is changed; and in a case that the signal of the gravity sensor is changed, enabling the driving portion to drive the reflecting portion to rotate.

* * * * *